Sept. 4, 1962   J. W. CLARK ET AL   3,052,747
AEOLIAN VIBRATION DAMPERS
Filed Aug. 11, 1960
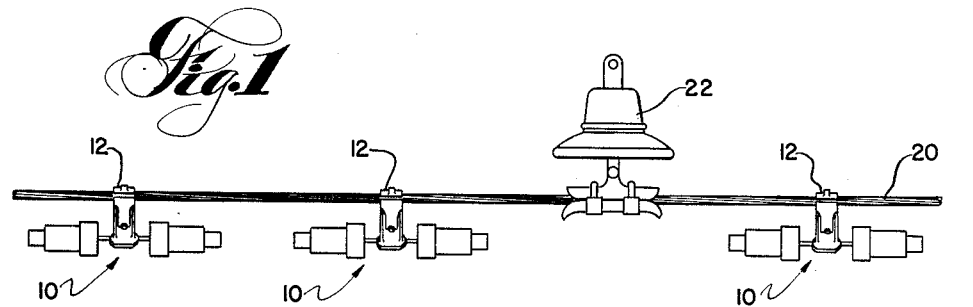
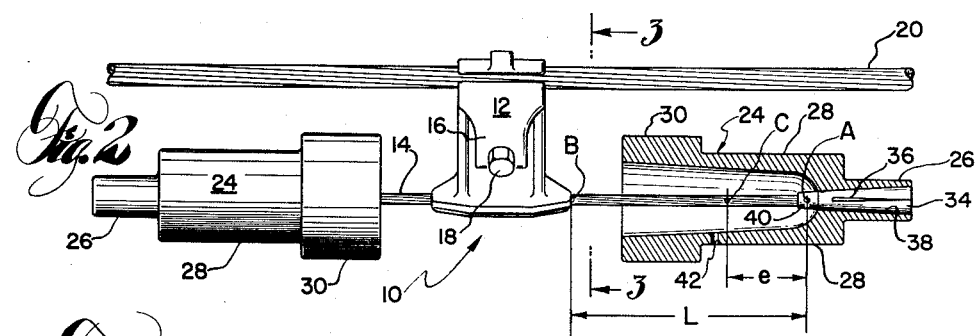
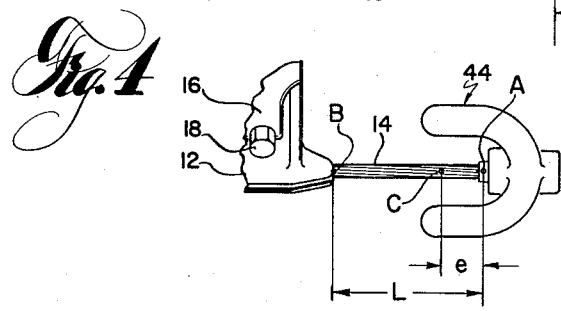
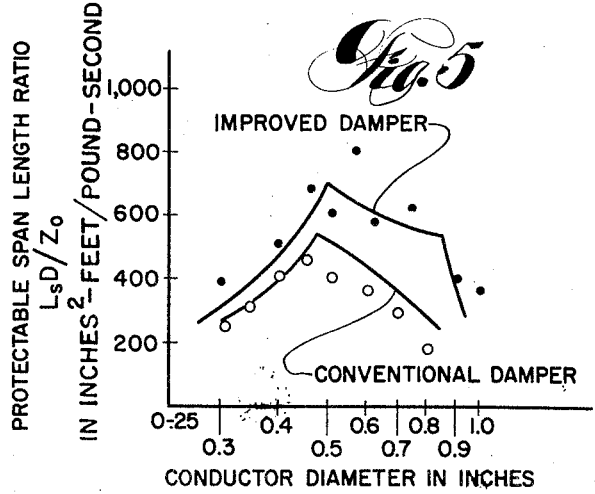
*INVENTORS*
JOHN W. CLARK
ROBERT F. YOUNG
CHARLES B. RAWLINS
BY
ATTORNEY

United States Patent Office 3,052,747
Patented Sept. 4, 1962

3,052,747
AEOLIAN VIBRATION DAMPERS
John W. Clark and Robert F. Young, New Kensington, Pa., and Charles B. Rawlins, Massena, N.Y., assignors to Aluminum Company of America, Pittsburgh, Pa., a corporation of Pennsylvania
Filed Aug. 11, 1960, Ser. No. 49,015
6 Claims. (Cl. 174—42)

This invention relates in general to new and improved vibration dampers for protecting suspended elongate members against vibration-induced fatigue failures adjacent their points of support or suspension. The invention is more particularly addressed to dampers for minimizing and/or preventing aeolian or wind-induced vibrations in strung or suspended elongate members, such as rods, cables, wires, and the like, a specific example of which is an overhead stranded electrical transmission cable or line.

It is a well recognized and accepted fact that suspended elongate members are vibrated by wind blowing thereagainst and that aeolian vibrations produced therein are a frequent source of fatigue failures in the elongate members adjacent their points of support or suspension. In the case of stranded cables, failure by fatigue may involve fracture of all, or less than all, of the strands incorporated in their fabrication. The aeolian vibrations complained of exist almost entirely in a substantially vertical plane, are most devastating in the range of wind velocities from 2 to 15 miles per hour, and are caused by alternate formation of eddy currents or vortices above and below the longitudinal axis of an elongate member on the leeward side thereof.

The amplitudes of individual aeolian vibrations have been determined and observed to be relatively small and normally less than the diameters of the elongate members so vibrated. In addition, it has been observed and determined that there are many loops and node points in any given length of span of a vibrating elongate member, with 100 loops in a 1000-foot span of a suspended electrical transmission line being a common occurrence.

The aeolian vibrations herein described are in contrast to the less frequently encountered and observed phenomenon of "galloping," which characterizes substantial and perceptibly large amplitudes of displacement of suspended elongate members, such as one or two loops per span, experienced with suspended electrical transmission cables and similar elongate members under wind and icing conditions.

The loop length, frequency and amplitude of aeolian vibrations vary over wide ranges of values for any given length of span, cross-sectional area of elongate member and tension within the suspended member, in accordance with the direction and velocity of the wind inducing the complained of vibrations. Manifestly, energy-absorbing devices, termed vibration dampers, have been devised and are in regular use in attachment on suspended elongate members, subject to aeolian vibration, for the express purpose of protecting the elongate members against fatigue failure adjacent their points of suspension.

One of the most effective and widely used dampers for preventing and/or minimizing aeolian vibrations in suspended elongate members is known commercially as the "Stockbridge" damper. This damper, as conventionally fabricated and used for more than twenty-five years, is described and illustrated in United States Letters Patent 1,992,538, issued February 26, 1935. In its essentials, the conventional Stockbridge damper herein referred to comprises a pair of inertia members, or weights, separated by an axially-extending resilient member to the opposite ends of which one each of the inertia members is secured. A clamp secured to the resilient member, intermediate the inertia members, is adapted to attach the damper to a suspended elongate member to be protected thereby, and in operation, aeolian vibrations in the suspended elongate member are transmitted to the damper, to shake or vibrate the inertia members under the energy-absorbing restraint of the resilient member supporting the same.

Twenty-five years of actual practice and regular use of conventional Stockbridge dampers of United States Letters Patent 1,992,538 has resulted in the necessity of providing and stocking at least twelve commercial damper sizes to satisfactorily accommodate and protect suspended electrical transmission line cables, having the approximate exterior diameter range 0.15" to 2", subject to aeolian vibration within prevailing wind velocities of 2 to 15 miles per hour. By "size of damper" is meant the total sprung weight of the two substantially equal weight inertia members, and the twelve conventional Stockbridge dampers in regular commercial use on electrical transmission line stranded conductors of the aforementioned approximate exterior diameter range of 0.15" to 2" have necessitated sprung weights falling within the range 1.5 to 20 pounds, the resilient member supporting the inertia members or weights being preferably a length of stranded steel cable.

A conventional Stockbridge damper is characterized by having points of effective attachment of its substantially identical inertia members or weights and its centrally disposed mounting clamp in respect of the resilient member or stranded cable element supporting the same. By "points of effective attachment" are meant points in the axial length of the resilient member of the damper, one each adjacent each of the inertia members, and one each adjacent each side of the central damper-affixing clamp, at which the resilient member is fixed against substantial rotation or oscillation about its longitudinal axis. It has also been mathematically and graphically established, and confirmed by laboratory and actual installations, that all twelve conventional Stockbridge dampers in present commercial practice employ a distribution of the weight and mass of each individual substantially identical inertia member which locates its center of gravity in the axis of the resilient member supporting the same at a point closely adjacent or coincident with the point of effective attachment of each inertia member to its resilient supporting member, as illustrated and described in United States Letters Patent 1,992,538.

Regardless of the highly satisfactory performance established by conventional Stockbridge dampers over the past twenty-five years, it now develops that the original twelve dampers of differing sprung weights can be reduced to half their number and provide the same, and in many instances greater, aeolian vibration, energy-absorbing capacity as did the original twelve dampers. This fact has been established by computer determinations and confirmed by laboratory span testing in an extensive analytical and test program extending over a period of eighteen months. The program in question established that the energy-absorbing capacity of a conventional Stockbridge damper can be improved as much as fifty percent when the mass and weight of the individual inertia members are reproportioned to shift the centers of gravity thereof axially inwardly along the longitudinal axis of the resilient member supporting the inertia members, towards the central damper-affixing clamp, out of coincidence or registry with or close adjacency to the effective point of attachment of each inertia member to its resilient supporting member. Recorded energy-absorbing capacities of improved Stockbridge dampers of the present invention have been so astounding that dampers with their inertia members reproportioned to shift their centers of gravity inwardly towards their central attaching clamps, and out of registry with the heretofore axially located centers of gravity, not only reduce the number of conventional Stockbridge diameters now stocked and regularly employed, but also permit use of the improved dampers on longer length spans under the influence of aeolian vibration.

It is an object of the present invention to provide an improved Stockbridge type damper of increased and superior energy-absorbing capacity.

Another object of the invention is to provide a Stockbridge type damper which differs from its conventional predecessor in that the mass of the individual inertia members is reproportioned and redistributed to locate the center of gravity of each inertia member inwardly towards the central attaching clamp of the damper out of coincidence, or substantially close adjacency to, the effective point of attachment of each inertia member to its resilient supporting member.

A still further object of the invention is to provide a new and improved Stockbridge type aeolian vibration damper of increased capacity and simplified construction.

Other objects and advantages of the improved dampers of the invention will be understood and readily discernible to those versed in and faced with the complex problems and behavior of vibrating structures, and fatigue failures resulting therefrom, on consideration of the following description and illustrations appended hereto, in which:

FIG. 1 represents an elevational view of a portion of a span length of suspended electrical transmission line with improved dampers of the invention in attachment thereto;

FIG. 2 represents, to enlarged scale, a preferred embodiment of the damper of the invention in partial longitudinal sectional elevation;

FIG. 3 represents a transverse elevational view taken on the plane 3—3 of FIG. 2;

FIG. 4 represents a fragmentary elevational view of an alternative embodiment of the invention; and FIG. 5 represents a chart comparing a conventional Stockbridge damper with an improved damper of the invention of the same total sprung weight.

The hereinafter specifically described dampers of the present invention were reached following a complex analysis of the physical design characteristics, existing mathematically and graphically established energy-absorbing capacities, and confirming laboratory and outdoor span data relating to the aforementioned twelve different sizes of conventional Stockbridge dampers, supplemented by computer derived determinations of the energy-absorbing capacities of simulated improved dampers for a series of electrical cables or conductors of selected suspended span lengths and diameters under known conditions of stringing tension and aeolian vibration. The results of this complex analysis and computer determinations have established that the existing twelve conventional Stockbridge dampers in regular commercial use could be improved to the point that fewer damper sizes were necessary to provide the same and increased vibration damping capacity, and it is to this end that the present invention is addressed through the provision of improved dampers having superior vibration dampening capacities in terms of conductor span lengths and diameters of conductors protected thereby.

More specifically, and referring to the illustrations one form of improved damper 10 of the invention comprises a cable-attaching clamp 12 compressed as by swaging, or otherwise engaged on a length 14 of resilient material, such as a stranded steel cable, intermediate the ends thereof. The clamp 12 is of generally hook shape remote from its engagement on the resilient member 14 and is provided with an adjustable cooperating arm or lug 16, and securing bolt 18, for clamping attachment or affixation of the damper to a suspended elongate member 20, such as an overhead electrical transmission cable or conductor supported in spaced span lengths by insulators 22.

An inertia member or weight 24 is secured to each outboard end of the length 14 of the resilient member. The inertia members 24 are of substantially equal mass and weight, in any one size or weight of damper, and in one form of the invention each inertia member is of generally tubular bell shape to provide an axially extending outboard reduced terminal end portion 26, an intermediate contiguous enlarged tubular body portion 28, and opposite terminal thickened end flange 30.

Connection and securement of an inertia member 24 on opposite ends of the resilient member 14 is preferably accomplished by employing a radially compressible sleeve or collet 34, which is preferably tapered and axially split or slitted from its large end axially inwardly towards its reduced end, one or more radial slits 36 having been found desirable. The sleeve 34 is received within a slightly tapered aperture or bore 38, centrally disposed and extending over the axial length of the reduced terminal end portion 26 and opening into the interior tubular body portion 28 of each inertia member 24, and is preferably provided with a tapered tip 40 extending into the tubular body portion 28 of each inertia member.

To complete firm connection and securement of the inertia members 24 on the resilient member 14, each outboard end thereof is axially extended into the axial bore through the tip 40 and body of a sleeve 34 within the aperture 38 in each inertia member, and the inner surface of the sleeve 34 thereafter radially and axially compressed into engagement on the resilient member 14 as by relative axial movement and wedging action developed between the outer tapered surface of the sleeve 34 and internal tapered surface of the bore or aperture 38 in each of the inertia members 24.

Distribution of the mass and weight of the individual inertia members 24, in respect of the overhung axial lengths of the resilient supporting member 14 on either side of the central cable-attaching clamp 12, is a significant structural feature of improved dampers of the invention. As earlier stated herein, a conventional Stockbridge damper is characterized by having points of effective attachment of its substantially identical inertia members and its centrally disposed cable-attaching clamp in respect of the resilient member or stranded cable carrying the weights and clamp. The aforesaid points of effective attachment remain essential to efficient damper construction, but increased damper efficiency has been obtained in the improved dampers of the invention as a result of a relocation of the center of gravity of each inertia member 24 inwardly and axially along the resilient member 14 towards the central cable-engaging and attaching clamp 12 from the position heretofore occupied by the center of gravity of each of the inertia members in conventional Stockbridge dampers.

FIG. 2 of the attached illustrations is pictorially illustrative of the shifted center of gravity of an inertia member 24 in accordance with improved damper structures of the invention. Therein parallel planes normal to the longitudinal axis of the resilient member 14 intersect the axis thereof at points A and B, which are representative in their location of two points of effective attachment, with the point A locating the center of gravtiy of the inertia member 24 in a conventional Stockbridge damper. It is at points A and B that the resilient member 14 is fixed or restrained against rotation or oscillation, as a result of aeolian vibrations within the suspended cable 20, a cardinal feature in vibration dampers of the general type known as Stockbridge dampers.

Of much greater significance is the determination for improved dampers of the invention of a relocation of the center of gravity of each inertia member or weight, in respect of the longitudinal axis of the resilient member 14 supporting the same, to a point inwardly along the aforesaid axis out of coincidence with or close adjacency to the point of effective attachment of an inertia member on its resilient member 14. In conventional Stockbridge dampers, represented by the twelve sizes thereof in regular commercial use today, the centers of gravity of their inertia weights have been located either in coincidence with the point of effective attachment of each inertia weight on its resilient supporting member 14 or in close adjacency thereto, and in no case did the center of gravity of a conventional Stockbridge damper deviate from the point of effective attachment of its damper weights in excess of 12 percent, in an inwardly direction towards the central clamp of the damper, of the unrestrained length of the resilient member 14 measured between the two points of effective attachment in its axial length on either side of the central clamp 12 of a conventional Stockbridge damper.

In the improved dampers of the invention, the center of gravity of each inertia weight or member 24 is never coincidental with the transverse plane through the longitudinal axis of the resilient member 14 at the point of effective attachment of an inertia member 24 thereto, or at point A, but is always located inwardly thereof toward the central clamp 12 of the dampers a distance greater than the 12 percent measurement above defined at a point illustrated at C, which in all cases for dampers falling within the scope of the invention lies in a plane transverse to the longitudinal axis of the resilient member 14, which is unrestrained or unconfined against rotation or oscillation in the normal operation of the improved dampers.

FIG. 2 of the attached illustrations also establishes a pictorial basis for proportionment of an improved damper falling within the scope of the present invention. Therein the distance between the point A, or point of effective attachment of an inertia member, and its center of gravity C, is shown as "$e$," and the distance between the two effective points of attachment A and B, is shown as "$L$." The ratio $e/L$ for the improved dampers of the invention, characterized by providing aeolian vibration, energy-absorbing capacities over a wider range of cable spans, diameters of cables, and applied stringing tensions, with fewer of the improved dampers required than heretofore necessary when using conventional Stockbridge dampers, has been determined to fall within the range of 0.14 to 0.35, with the center of gravity of each of the inertia weights 24 always falling in the longitudinal axis of the resilient member 14 at some point C in its axial overhanging length inboard of the tapered tip 40 of the inertia member attaching collet 34. The new location of the center of gravity of each inertia weight or member 24 in an unrestrained axial length of the resilient member 14 supporting the same, is the critical feature responsible for the superior energy-absorbing characteristics of dampers of the invention.

FIG. 4 represents a fragmentary elevational view of an alternative form of inertia member 44, which can replace the inertia member 24 in the earlier described improved damper of the invention. The inertia member 44 is generally C-shaped and the damper is otherwise substantially the same as that illustrated to best advantage in FIGS. 2 and 3, with similar elements identified by the same reference numerals. The center of gravity of the inertia weight 44, illustrated at C, also falls within the $e/L$ range 0.14 to 0.35 as in the earlier described improved damper of the invention.

The embodiment of the invention illustrated in FIG. 4 has its two inertia members 44 supported on the resilient member 14 in a common vertical or horizontal plane through the longitudinal axis of the resilient supporting member 14, the C-shape of the individual inertia weights providing a self-draining feature through their discontinuous or open sides against internal moisture collection. In the case of the inertia members 24, however, it is desirable to provide one or more moisture draining apertures 42 for this purpose.

Conventional Stockbridge and improved dampers of the invention were compared over a wide range of conductor diameters and span lengths under known conditions of tension within the range from 15 to 25 percent of the ultimate load on the conductors supporting the dampers. Both types of dampers were compared on the basis of the length of conductor span that each type and weight of damper would protect against excessive aeolian vibration for wind velocities of 2 to 15 miles per hour. It was actually more convenient to use the ratio $L_sD/Z_0$, in the computer analysis and determinations carried out in the comparative damper test program, as the measure of span length of elongate member protected against excessive aeolian vibration, where:

$L_s$=Protectable span length of elongate member expressed in feet.
$D$=Diameter of elongate member expressed in inches.
$Z_0$="Characteristic impedance"—or the square root of the product of the tension in and weight of the elongate member divided by "$g$" (32.2), expressed in pound-seconds per foot.

and FIG. 5 has been included in the appended illustrations to depict and pictorially point up the superiority of an improved three pound total sprung weight damper over the conventional Stockbridge damper of the same total sprung weight at a characteristic impedance or $Z_0$ of 4 pound-seconds per foot.

The chart of FIG. 5 has plotted the protectable span length ratios, or $L_sD/Z_0$ valves, as ordinates and elongate member diameters as abscissae for a three-pound conventional Stockbridge and similar total sprung weight improved damper, the two legend-identified curves on the chart having been established by computer and the open and solid circular points adjacent the curves having been established under laboratory controlled testing of the three-pound Stockbridge and improved dampers, respectively. The two identified curves of FIG. 5 clearly and comparatively establish the superiority of the improved damper.

While the invention has been explained and described with special reference to two specific embodiments thereof, it should be understood that other forms thereof could be employed without departing from the spirit and scope of the appended claims.

What is claimed is:
1. In a vibration damper comprising a pair of inertia members one each fixedly supported at the ends of a resilient member, and provided with a clamp engaging the resilient member intermediate the inertia members for attachment of the damper to a suspended elongate member subject to aeolian vibration, the improvement comprising locating the center of gravity of each inertia member in the longitudinal axis of the resilient member at a point therein between the effective points of attachment of the intermediate clamp and each inertia member in respect of the axial length of the resilient member therebetween at a distance from the point of effective attachment of each inertia member in excess of 12 percent of the distance between the two points of effective attachment.

2. In a vibration damper comprising a pair of substantially equal weight and similarly geometrically proportioned inertia members one each of which is securely attached to a relatively stiff longitudinal resilient member at its terminal ends, and having a clamp intermediate and spaced from the inertia members in secure attachment to the resilient member, said damper being adapted through its intermediate clamp for securement to a suspended elongate member subject to aeolian vibration, the improvement comprising locating the center of gravity of each inertia member in the longitudinal axis of the resilient member inwardly of its effective point of attachment to the resilient member towards the effective point of attachment of the intermediate clamp to the resilient member, and said inward location of the center of gravity of each inertia member being inwardly and axially spaced from the point of effective attachment of the same a distance in excess of 12 percent of the axial distance between the points of effective attachment of each inertia member and the intermediate clamp.

3. A vibration damper comprising a pair of substantially equal weight substantially identically proportioned inertia members one each of which is fixedly secured to opposite ends of a length of relatively stiff but resilient stranded cable, and having a clamp intermediate and axially spaced from the inertia members in secure attachment to the stranded cable for attachment of the damper to an elongate member subject to aeolian vibration, the improvement comprising locating the center of gravity of each inertia member in the longitudinal axis of the stranded cable inwardly of its effective point of attachment thereto towards the effective point of attachment of the intermediate clamp to the stranded cable, the center of gravity of each inertia member being located in accordance with the ratio $e/L$ within the range from 0.14 to 0.35, where $e$ is equal to the axial distance between the point of effective attachment of an inertia member on the stranded cable and its center of gravity and $L$ is equal to the axial distance between the point of effective attachment of the intermediate clamp and inertia member on the same side of the clamp.

4. A vibration damper for elongate members comprising a pair of inertia members of substantially equal weight and geometrical proportion, a resilient member to opposite ends of which one each of the inertia members is firmly attached, a clamp in firm engagement with the resilient member intermediate the inertia members and adapted to attach and secure the damper to an elongate member to protect the same against vibrations therein, said damper being characterized by a point of effective attachment of its intermediate clamp and a point of effective attachment of each of its inertia members in respect of the longitudinal axis of the resilient member at which points the resilient member is substantially devoid of vibration-induced oscillation about its longitudinal axis, and said inertia members each having its center of gravity in the longitudinal axis of the resilient member between each pair of points of effective attachment of the damper on either side of the intermediate clamp in a freely oscillatable and unrestrained axial length portion of the resilient member at a measured distance therein from the point of effective attachment of each inertia member in excess of 12 percent of the axial distance between the two points of effective attachment on either side of the intermediate clamp.

5. A vibration damper for elongate suspended electrical transmission cables comprising a pair of inertia members of substantially equal weight and symmetrical proportions, a resilient member to opposite ends of which one each of the inertia members is firmly attached in axially symmetrical disposition with respect to the axis of the resilient member, a clamp in firm engagement with the resilient member intermediate the inertia members and adapted to attach and secure the damper dependently on a suspended transmission cable to protect the same against vibrations therein, said damper being characterized by a point of effective attachment of its intermediate clamp and a point of effective attachment of each of its inertia members in respect of the longitudinal axis of the resilient member at which points the resilient member is substantially devoid of vibration-induced oscillation about its longitudinal axis, and said inertia members each having its center of gravity in the longitudinal axis of the resilient member between each pair of points of effective attachment of the damper on either side of the intermediate clamp in a freely oscillatable and unrestrained axial length portion of the resilient member at a measured distance therein from the point of effective attachment of each inertia member in excess of 12 percent of the axial distance between the two points of effective attachment on either side of the intermediate clamp.

6. An aeolian vibration damper for elongate suspended members subject to wind-induced vibrations therein, said damper comprising a pair of substantially identical inertia members of generally bell-shape, a substantially stiff resilient member to the opposite ends of which one each of the inertia members is firmly attached adjacent its closed end with the open ends thereof facing each other, a clamp in firm engagement with the resilient member intermediate the inertia members in spaced relationship to their open ends, said clamp being adapted to attach and secure the damper to a suspended elongate member to dissipate wind-induced vibrations therein, said damper being characterized by effective points of attachment of its intermediate clamp and each inertia member in respect of the resilient member in planes transverse to the longitudinal axis thereof adjacent the intermediate clamp and closed end of each inertia member, respectively, at which effective points of attachment the resilient member is substantially devoid of vibration-induced oscillation about its longitudinal axis, said inertia members each having its center of gravity in the longitudinal axis of the resilient member in a plane lying between the two points of effective attachment on either side of the intermediate clamp in an unrestrained and freely oscillatable axial length portion of the resilient member, and said center of gravity of each inertia member being axially inwardly located toward the intermediate clamp a distance in excess of 12 percent of the unrestrained resilient member measured from the point of effective attachment of an inertia member.

References Cited in the file of this patent

UNITED STATES PATENTS

| | | |
|---|---|---|
| 1,992,538 | Monroe et al. | Feb. 26, 1935 |
| 2,089,456 | Walsh | Aug. 10, 1937 |
| 2,094,899 | MacIntyre | Oct. 5, 1937 |